(12) United States Patent
Luo et al.

(10) Patent No.: US 12,437,260 B2
(45) Date of Patent: Oct. 7, 2025

(54) DATA DISPLAY METHOD AND APPARATUS

(71) Applicants: Beijing Wodong Tianjun Information Technology Co., Ltd., Beijing (CN); BEIJING JINGDONG CENTURY TRADING CO., LTD., Beijing (CN)

(72) Inventors: Xun Luo, Beijing (CN); Mengyang Yin, Beijing (CN)

(73) Assignees: Beijing Wodong Tianjun Information Technology Co., Ltd., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 294 days.

(21) Appl. No.: 17/998,632

(22) PCT Filed: Apr. 30, 2021

(86) PCT No.: PCT/CN2021/091783
§ 371 (c)(1),
(2) Date: Nov. 11, 2022

(87) PCT Pub. No.: WO2022/041828
PCT Pub. Date: Mar. 3, 2022

(65) Prior Publication Data
US 2023/0351320 A1    Nov. 2, 2023

(30) Foreign Application Priority Data
Aug. 24, 2020   (CN) .......................... 202010857293.0

(51) Int. Cl.
*G06Q 10/087*    (2023.01)
*G06Q 10/10*    (2023.01)

(52) U.S. Cl.
CPC ................................. *G06Q 10/087* (2013.01)

(58) Field of Classification Search
CPC .......... G06Q 10/087; G06Q 10/06315; G06Q 30/02; G06Q 30/0202
(Continued)

(56) References Cited

U.S. PATENT DOCUMENTS 9,779,375 B2 * 10/2017 Grabovski ....... G06Q 10/06316

FOREIGN PATENT DOCUMENTS

| CN | 106022859 A | 10/2016 |
| CN | 108280733   * | 1/2017 |

(Continued)

OTHER PUBLICATIONS

Supplementary European Search Report dated Aug. 8, 2024 for European Application No. 21859675.7.
(Continued)

*Primary Examiner* — Garcia Ade (57) ABSTRACT

A data display method and an apparatus. The method includes: obtaining, from a first device, an object parameter and a service forecast quantity of a first object in a first service unit, and an available quantity of the first object; determining a first replenishment quantity for making replenishment for the first object in the first service unit according to the object parameter and the service forecast quantity; and determining a second replenishment quantity for replenishment that needs to be made for the first object in the first service unit according to the available quantity and the first replenishment quantity, and displaying the second replenishment quantity, which is used to improve an efficiency of making replenishment for the first object in the first service unit.

20 Claims, 5 Drawing Sheets

(58) Field of Classification Search
USPC .......................................................... 705/28
See application file for complete search history.

(56) References Cited

FOREIGN PATENT DOCUMENTS

| | | |
|---|---|---|
| CN | 106971249 A | 7/2017 |
| CN | 107657410 A | 2/2018 |
| CN | 109754207 A | 5/2019 |
| CN | 109949095 A | 6/2019 |
| CN | 109993484 A | 7/2019 |
| CN | 110363454 A | 10/2019 |
| CN | 110516998 A | 11/2019 |
| CN | 111062756 A | 4/2020 |
| CN | 111105195 A | 5/2020 |
| CN | 111242524 A | 6/2020 |
| CN | 111429048 A | 7/2020 |
| JP | 2007200185 A | 8/2007 |
| JP | 2021163485 A | 10/2021 |
| WO | WO2020007352 A1 | 1/2020 |

OTHER PUBLICATIONS

Notification to Grant Patent Right for Invention dated May 10, 2024 for Chinese Patent Application No. 202010857293.0.
International Search Report and Written Opinion dated Jul. 26, 2021 for International Application No. PCT/CN2021/091783.
Notice of Reasons for Refusal dated Sep. 19, 2023 regarding Japanese Patent Application No. 2022-569461.
The First Office Action dated Nov. 27, 2023 regarding Chinese Application No. 202010857293.0.

\* cited by examiner

DATA DISPLAY METHOD AND APPARATUS

CROSS-REFERENCES TO RELATED APPLICATIONS

The present application is a National Stage of International Application No. PCT/CN2021/091783, filed on Apr. 30, 2021, which claims priority to Chinese patent application No. 202010857293.0, filed with China National Intellectual Property Administration on Aug. 24, 2020 and entitled "Data Display Method and Apparatus". The contents of the aforementioned applications are hereby incorporated by reference in their entities.

TECHNICAL FIELD

Embodiments of the present disclosure relate to the field of computer technologies and, in particular, to a data display method and an apparatus.

BACKGROUND

At present, in a process of selling commodities in a store, when an existing inventory of a certain commodity in the store is insufficient, it is usually necessary to obtain a purchase quantity for the commodity and make replenishment for the commodity according to the purchase quantity.

In the related art, a method of obtaining a purchase quantity of a commodity includes that: a salesman calculates a historical average sales volume within a preset period according to a historical sales volume of the commodity within a historical period; then determines a difference between a product of the historical average sales volume and an inventory turnover and an existing inventory as the purchase quantity; and makes replenishment for the commodity according to the purchase quantity.

SUMMARY

Embodiments of the present disclosure provide a data display method and an apparatus.

In a first aspect, an embodiment of the present disclosure provides a data display method, including:
  acquiring, from a first device, an object parameter and a service forecast quantity of a first object in a first service unit, and an available quantity of the first object;
  determining a first replenishment quantity for making replenishment for the first object in the first service unit according to the object parameter and the service forecast quantity; and
  determining a second replenishment quantity for replenishment that needs to be made for the first object in the first service unit according to the available quantity and the first replenishment quantity, and displaying the second replenishment quantity.

In a possible design, the object parameter includes at least one of the following parameters: a service duration, a replenishment frequency, a number of service day, a display parameter, a minimum processing quantity, a minimum processing amount, an existing quantity, a first forecast quantity, a second forecast quantity and an object specification of the first object.

In a possible design, determining the first replenishment quantity for making replenishment for the first object in the first service unit according to the object parameter and the service forecast quantity includes: determining a secure storage quantity for storing the first object in the first service unit according to the service duration, the replenishment frequency, the service forecast quantity and the display parameter; determining a spare storage quantity for storing the first object in the first service unit according to the service forecast quantity, the service duration, the replenishment frequency and the number of service day; and determining the first replenishment quantity according to the secure storage quantity, the spare storage quantity and the existing quantity.

In a possible design, determining the first replenishment quantity according to the secure storage quantity, the spare storage quantity and the existing quantity includes: determining a target storage quantity for storing the first object in the first service unit according to the secure storage quantity and the spare storage quantity; and determining the first replenishment quantity according to the target storage quantity and the existing quantity upon determining that the existing quantity is less than or equal to the secure storage quantity.

In a possible design, the target storage quantity is a sum of the secure storage quantity and the spare storage quantity; and the first replenishment quantity is a difference between the target storage quantity and the existing quantity.

In a possible design, determining the second replenishment quantity for replenishment that needs to be made for the first object in the first service unit according to the available quantity and the first replenishment quantity includes: upon determining that the available quantity is greater than or equal to a preset threshold, performing a first replenishment adjustment on the first replenishment quantity to obtain the second replenishment quantity; and upon determining that the available quantity is less than the preset threshold, performing a second replenishment adjustment on the first replenishment quantity to obtain the second replenishment quantity.

In a possible design, before performing the first replenishment adjustment on the first replenishment quantity to obtain the second replenishment quantity of the first object in the first service unit, the method further includes: acquiring a third replenishment quantity of the first object in a second service unit; and performing the first replenishment adjustment on the first replenishment quantity to obtain the second replenishment quantity upon determining that a sum of the first replenishment quantity and the third replenishment quantity is less than the available quantity.

In a possible design, the first replenishment quantity is determined as the second replenishment quantity upon determining that the sum of the first replenishment quantity and the third replenishment quantity is greater than or equal to the available quantity.

In a possible design, performing the first replenishment adjustment on the first replenishment quantity to obtain the second replenishment quantity includes: determining an object adjustment quantity according to the available quantity, the first replenishment quantity, the first forecast quantity and the existing quantity of the first object in the first service unit, and a first replenishment quantity, a first forecast quantity and an existing quantity of the first object in a second service unit; and processing the object adjustment quantity and the object specification through a first preset model to obtain the second replenishment quantity.

In a possible design, performing the second replenishment adjustment on the first replenishment quantity to obtain the second replenishment quantity includes: acquiring a first replenishment amount corresponding to the first replenishment quantity; determining a number of object turnover day according to the first replenishment quantity, the existing quantity and the second forecast quantity upon determining that the first replenishment quantity and the first replenishment amount meet a preset condition; and determining the second replenishment quantity according to the number of object turnover day, a preset number of turnover day, the second forecast quantity, the existing quantity, the minimum processing quantity, the minimum processing amount and the object specification.

In a possible design, acquiring the first replenishment amount corresponding to the first replenishment quantity includes: acquiring an object value of the first object; and determining a product of the object value and the first replenishment quantity as the first replenishment amount.

In a possible design, determining the number of object turnover day according to the first replenishment quantity, the existing quantity and the second forecast quantity includes: determining a quotient obtained by dividing a product of the first replenishment quantity and the existing quantity by the second forecast quantity as the number of object turnover day.

In a possible design, determining the second replenishment quantity according to the number of object turnover day, the preset number of turnover day, the second forecast quantity, the existing quantity, the minimum processing quantity, the minimum processing amount and the object specification includes: increasing the number of object turnover day by a preset value; determining a recommended replenishment quantity of the first object in the first service unit according to an updated number of object turnover day, the second forecast quantity and the existing quantity upon determining that the updated number of object turnover day is greater than the preset number of turnover day; and determining the second replenishment quantity according to the recommended replenishment quantity, a recommended replenishment amount corresponding to the recommended replenishment quantity, the minimum processing quantity, the minimum processing amount and the object specification.

In a possible design, determining the second replenishment quantity according to the recommended replenishment quantity the minimum processing quantity, the minimum processing amount and the object specification includes: upon determining that the recommended replenishment quantity is greater than or equal to the minimum processing quantity, and the recommended replenishment amount is greater than or equal to the minimum processing amount, processing the recommended replenishment quantity and the object specification through a second preset model to obtain the second replenishment quantity.

In a second aspect, an embodiment of the present disclosure provides a data display apparatus, including an acquisition module, a determination module and a display module, where, the acquisition module is configured to acquire, from a first device, an object parameter and a service forecast quantity of a first object in a first service unit, and an available quantity of the first object;

the determination module is configured to determine a first replenishment quantity for making replenishment for the first object in the first service unit according to the object parameter and the service forecast quantity;

the determination module is further configured to determine a second replenishment quantity for replenishment that needs to be made for the first object in the first service unit according to the available quantity and the first replenishment quantity; and the display module is configured to display the second replenishment quantity.

In a possible design, the object parameter includes at least one of the following parameters: a service duration, a replenishment frequency, a number of service day, a display parameter, a minimum processing quantity, a minimum processing amount, an existing quantity, a first forecast quantity, a second forecast quantity and an object specification of the first object.

In a possible design, the determination module is specifically configured to:
determine a secure storage quantity for storing the first object in the first service unit according to the service duration, the replenishment frequency, the service forecast quantity and the display parameter;
determine a spare storage quantity for storing the first object in the first service unit according to the service forecast quantity, the service duration, the replenishment frequency and the number of service day; and
determine the first replenishment quantity according to the secure storage quantity, the spare storage quantity and the existing quantity.

In a possible design, the determination module is specifically configured to:
determine a target storage quantity for storing the first object in the first service unit according to the secure storage quantity and the spare storage quantity; and
determine the first replenishment quantity according to the target storage quantity and the existing quantity upon determining that the existing quantity is less than or equal to the secure storage quantity.

In a possible design, the target storage quantity is a sum of the secure storage quantity and the spare storage quantity; and
the first replenishment quantity is a difference between the target storage quantity and the existing quantity.

In a possible design, the determination module is further specifically configured to: upon determining that the available quantity is greater than or equal to a preset threshold, perform a first replenishment adjustment on the first replenishment quantity to obtain the second replenishment quantity; and upon determining that the available quantity is less than the preset threshold, perform a second replenishment adjustment on the first replenishment quantity to obtain the second replenishment quantity.

In a possible design, the determination module is further specifically configured to: before performing the first replenishment adjustment on the first replenishment quantity to obtain the second replenishment quantity of the first object in the first service unit, acquire a third replenishment quantity of the first object in a second service unit; and perform the first replenishment adjustment on the first replenishment quantity to obtain the second replenishment quantity upon determining that a sum of the first replenishment quantity and the third replenishment quantity is less than the available quantity.

In a possible design, the first replenishment quantity is determined as the second replenishment quantity upon determining that the sum of the first replenishment quantity and the third replenishment quantity is greater than or equal to the available quantity.

In a possible design, the determination module is further specifically configured to: determine an object adjustment quantity according to the available quantity, the first replenishment quantity, the first forecast quantity and the existing quantity of the first object in the first service unit, and a first replenishment quantity, a first forecast quantity and an existing quantity of the first object in a second service unit; and process the object adjustment quantity and the object specification through a first preset model to obtain the second replenishment quantity.

In a possible design, the determination module is further specifically configured to acquire a first replenishment amount corresponding to the first replenishment quantity; determine a number of object turnover day according to the first replenishment quantity, the existing quantity and the second forecast quantity upon determining that the first replenishment quantity and the first replenishment amount meet a preset condition; and determine the second replenishment quantity according to the number of object turnover day, a preset number of turnover day, the second forecast quantity, the existing quantity, the minimum processing quantity, the minimum processing amount and the object specification.

In a possible design, the determination module is specifically configured to: acquire an object value of the first object; and determine a product of the object value and the first replenishment quantity as the first replenishment amount.

In a possible design, the determination module is further specifically configured to determine a quotient obtained by dividing a product of the first replenishment quantity and the existing quantity by the second forecast quantity as the number of object turnover day.

In a possible design, the determination module is further specifically configured to: increase the number of object turnover day by a preset value; determine a recommended replenishment quantity of the first object in the first service unit according to an updated number of object turnover day, the second forecast quantity and the existing quantity upon determining that the updated number of object turnover day is greater than the preset number of turnover day; and determine the second replenishment quantity according to the recommended replenishment quantity, a recommended replenishment amount corresponding to the recommended replenishment quantity, the minimum processing quantity, the minimum processing amount and the object specification.

In a possible design, the determination module is further specifically configured to: upon determining that the recommended replenishment quantity is greater than or equal to the minimum processing quantity, and the recommended replenishment amount is greater than or equal to the minimum processing amount, process the recommended replenishment quantity and the object specification through a second preset model to obtain the second replenishment quantity.

In a third aspect, an embodiment of the present disclosure provides a data display apparatus, including at least one processor and a memory;
  the memory stores computer execution instructions;
  the at least one processor executes the computer execution instructions stored in the memory, to cause the at least one processor to execute the data display method according to any one of the first aspect above.

In a fourth aspect, an embodiment of the present disclosure provides a computer-readable storage medium, where computer execution instructions are stored in the computer-readable storage medium, and when a processor executes the computer execution instructions, the data display method according to any one of the first aspect above is implemented.

In a fifth aspect, an embodiment of the present disclosure provides a program product including a computer program, where the program product causes a computer to execute the data display method described above when running on the computer.

In a sixth aspect, an embodiment of the present disclosure provides a computer program for executing the data display method described above when the computer program is executed by a processor.

The present application provides a data display method and an apparatus. The method includes: acquiring, from a first device, an object parameter and a service forecast quantity of a first object in a first service unit, and an available quantity of the first object; determining a first replenishment quantity for making replenishment for the first object in the first service unit according to the object parameter and the service forecast quantity; and determining a second replenishment quantity for replenishment that needs to be made for the first object in the first service unit according to the available quantity and the first replenishment quantity, and displaying the second replenishment quantity.

BRIEF DESCRIPTION OF DRAWINGS

In order to explain technical solutions of embodiments of the present disclosure or in the related art more clearly, the following will briefly introduce the accompanying drawings that need to be used in the description of the embodiments or the related art. It is obvious that the accompanying drawings in the following description are some embodiments of the present disclosure, and for those skilled in the art, other drawings may also be obtained based on these drawings without creative effort.

DESCRIPTION OF EMBODIMENTS

In order to make the purpose, technical solutions and advantages of embodiments of the present disclosure clearer, the technical solutions in the embodiments of the present disclosure will be described below clearly and comprehensively in combination with the accompanying drawings in the embodiments of the present disclosure. Obviously, the described embodiments are part of the embodiments of the present disclosure, not all of the embodiments. Based on the embodiments of the present disclosure, all other embodiments obtained by those of ordinary skilled in the art without creative effort belong to the protection scope of the present disclosure.

The terms "first", "second", "third", "fourth" and the like (if any) in the description and/or claims of the present disclosure and the above drawings are used to distinguish similar objects, and do not need to be used to describe a specific order or a sequence. It should be understood that the terms used in this way can be interchanged under appropriate circumstances, so that the embodiments of the present disclosure described herein can be implemented in an order other than those illustrated or described here. In addition, the terms "include" and "have" and any variation thereof are intended to cover non-exclusive inclusion, for example, processes, methods, systems, products or devices including a series of steps or units are not necessarily limited to those clearly listed, but may include other steps or units that are not clearly listed or are inherent to these processes, methods, products or devices.

Figure 1:
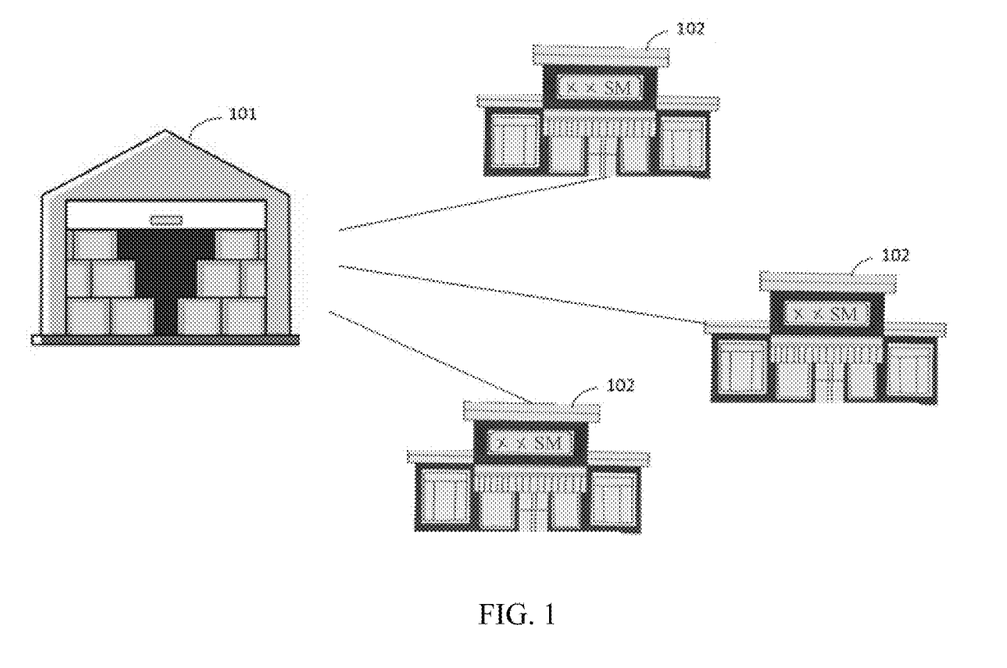
FIG. 1 is a schematic diagram of an application scenario of a data display method provided by one or more embodiments of the present application.

FIG. 1 is a schematic diagram of an application scenario of a data display method provided by one or more embodiments of the present application. Referring to FIG. 1, a supplier 101 and at least one store 102 are included.

The supplier 101 may supply commodities to each store 102, and each store 102 may sell commodities supplied by the supplier 101. In an implementation, data communication may be performed between the at least one store 102, where the at least one store 102 may be an associated supermarket (SM) (e.g., a chain supermarket) or an independent supermarket.

In a practical application, each store 102 is provided with a data display apparatus. For a store 102, the data display apparatus in the store 102 may acquire an object parameter and a commodity forecast sales volume of each commodity, and an available supply quantity of the supplier 101, and then determine a replenishment quantity for replenishment that needs to be made for the commodity in the store 102 according to the object parameter, the commodity forecast sales volume and the available supply quantity, thereby improving a replenishment efficiency of the commodity.

Next, the data display method provided by the present application will be described by taking an example in which a first object is a commodity and a first service unit is a store. It should be noted that the following specific embodiments may be combined with each other, and same or similar contents will not be repeated in different embodiments.

Figure 2:
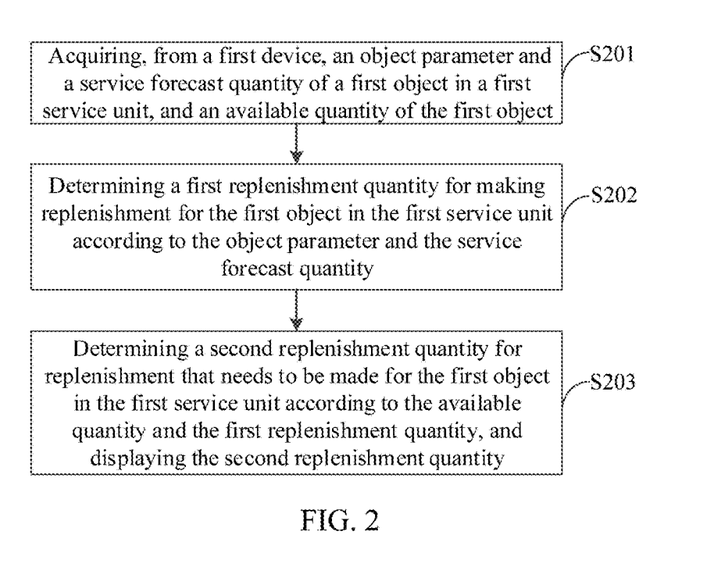
FIG. 2 is a schematic flowchart 1 of a data display method provided by one or more embodiments of the present application.

FIG. 2 is a schematic flowchart 1 of a data display method provided by one or more embodiments of the present application. As shown in FIG. 2, the data display method includes the following steps.

S201: acquiring, from a first device, an object parameter and a service forecast quantity of a first object in a first service unit, and an available quantity of the first object.

In an implementation, an executive entity of the embodiment of the present application may be a computer device provided in the first service unit, or a data display apparatus provided in the computer device, and the data display apparatus may be implemented by a combination of software and/or hardware.

In an implementation, the first device is a device which is provided in the first service unit and provided with a replenishment central-control configuration system. For example, when the first object is a commodity, the object parameter is commodity information stored in the first device, and the service forecast quantity is a forecast sales volume of each day within a preset number of days in the future, where the preset number of days may be 90 days, etc.

The available quantity of the first object may be an available supply quantity of a supplier corresponding to the commodity.

In a possible design, the object parameter includes at least one of the following parameters: a service duration, a replenishment frequency, a number of service day, a display parameter, a minimum processing quantity, a minimum processing amount, an existing quantity, a first forecast quantity, a second forecast quantity and an object specification of the first object.

For example, when the first object is a commodity, the service duration may be a duration for goods arrival; the replenishment frequency may be a frequency of making replenishment for goods; the number of service day may be a number of days for stock preparation; the display parameter may include a display quantity and a minimum display quantity; the minimum processing quantity is a minimum order quantity; the minimum processing amount is a minimum order amount; the existing quantity may be an available inventory of the store; the first forecast quantity may be an average forecast sales volume of the store in 7 (or 14, 21, etc.) days; the second forecast quantity is an average forecast sales volume of the store in 28 (or 31, 38, etc.) days; and the object specification may be a carton size.

For example, when the first object is a commodity, the service forecast quantity may be determined according to a historical sales volume of the commodity in the store and according to whether the commodity is promoted, whether it is a holiday, weather conditions and so on within the preset number of days in the future.

In an implementation, a sales forecast system may be provided in the computer device of the first service unit, and the sales forecast system may be used to determine the service forecast quantity according to the historical sales volume of the commodity in the store and according to whether the commodity is promoted, whether it is a holiday, the weather conditions and so on within the preset number of days in the future.

S202: determining a first replenishment quantity for making replenishment for the first object in the first service unit according to the object parameter and the service forecast quantity.

In a possible design, a secure storage quantity for storing the first object in the first service unit is determined according to the service duration, the replenishment frequency, the service forecast quantity and the display parameter;

a spare storage quantity for storing the first object in the first service unit is determined according to the service forecast quantity, the service duration, the replenishment frequency and the number of service day; and the first replenishment quantity is determined according to the secure storage quantity, the spare storage quantity and the existing quantity.

In an implementation, the secure storage quantity may be determined by the following feasible Formula 1:

$$A = \max(\text{sum}(\text{FCST}(1), \ldots, \text{FCST}(v+n)) + k\sqrt{\mu_L \sigma_D^2}, \min(c_1, c_2)) \quad \text{Formula 1};$$

where A is the secure storage quantity, max is an operation of taking a maximum value, sum is a summation operation (i.e. a sum of FCST(1)~FCST(v+n) is obtained, FCST(1) is a forecast sales volume on a first day in the service forecast quantity, FCST(v+n) is a forecast sales volume on a (v+n)th day in the service forecast quantity, v is the duration for goods arrival (i.e. the service duration), n is the frequency of making replenishment for goods (i.e. the replenishment frequency), k is a purchase coefficient (taking a default value of a system configuration: 95%), $\mu_L$ is an average value of a forecast sales volume of each day in the service forecast quantity, $\sigma_D$ is a standard deviation of the forecast sales volume of each day in the service forecast quantity, min is an operation of taking a minimum value, $c_1$ is the display quantity in the display parameter, and $c_2$ is the minimum display quantity in the display parameter.

In an implementation, the spare storage quantity may be determined by the following feasible Formula 2:

$$B=\text{sum}(\text{FCST}(v+n), \ldots, \text{FCST}(v+n+m)) \qquad \text{Formula 2;}$$

where B is the spare storage quantity, sum is a summation operation (i.e. a sum of FCST(v+n)~FCST(v+n+m) is obtained, FCST(v+n) is the forecast sales volume on the (v+n)th day in the service forecast quantity, FCST(V+n+m) is a forecast sales volume on a (v+n+m)th day in the service forecast quantity, v is the duration for goods arrival (i.e. the service duration), n is the frequency of making replenishment for goods (i.e. the replenishment frequency), and m is a number of spare day (i.e. the number of service day).

In a practical application, if a specific value of the above number of service day m is not configured in the object parameter, the number of service day may be set to be the same as the service duration v by default.

Further, a target storage quantity for storing the first object in the first service unit may be determined according to the secure storage quantity and the spare storage quantity, and then the first replenishment quantity is obtained according to the existing quantity, the secure storage quantity and the target storage quantity. Specifically, please refer to the method for determining a first replenishment quantity in an embodiment of FIG. 3.

S203: determining a second replenishment quantity for replenishment that needs to be made for the first object in the first service unit according to the available quantity and the first replenishment quantity, and displaying the second replenishment quantity.

Specifically, the first replenishment quantity may be adjusted according to the available quantity to obtain the second replenishment quantity.

For example, when the available quantity is less than the first replenishment quantity, the first replenishment quantity is adjusted to obtain the second replenishment quantity; when the available quantity is greater than or equal to the first replenishment quantity, the first replenishment quantity may be determined as the second replenishment quantity.

It should be noted that when the available quantity is greater than or equal to the first replenishment quantity, it means that the available supply quantity provided by the supplier (i.e., the available quantity) is sufficient to replenish the store (i.e., the first service unit); when the available quantity is less than the first replenishment quantity, it means that the available supply quantity provided by the supplier is insufficient to replenish the store.

Further, after the second replenishment quantity is determined, the second replenishment quantity may be sent to a computer device corresponding to the supplier, so that the supplier makes replenishment for the first object to the first service unit according to the second replenishment quantity.

In the related art, the purchase quantity of a commodity is obtained manually, and the purchase quantity is usually determined only when there is no available inventory of the first object in the store, resulting in an inability to make replenishment for the commodity in time and low replenishment efficiency. Different from the related art, the data display method in the present application can be applied to determine the second replenishment quantity of other objects (such as a second object and a third object) with available inventory, so as to improve the timeliness of making replenishment for the objects.

The data display method provided in the embodiment of the present application includes: acquiring, from the first device, the object parameter and the service forecast quantity of the first object in the first service unit, and the available quantity of the first object; determining the first replenishment quantity for making replenishment for the first object in the first service unit according to the object parameter and the service forecast quantity; and determining the second replenishment quantity for replenishment that needs to be made for the first object in the first service unit according to the available quantity and the first replenishment quantity, and displaying the second replenishment quantity. In the above method, the determination of the second replenishment quantity does not need to rely on manual work, which improves the replenishment efficiency of the first object.

On the basis of the above embodiments, the data display method provided by the present application will be further described with reference to FIG. 3.

Figure 3:
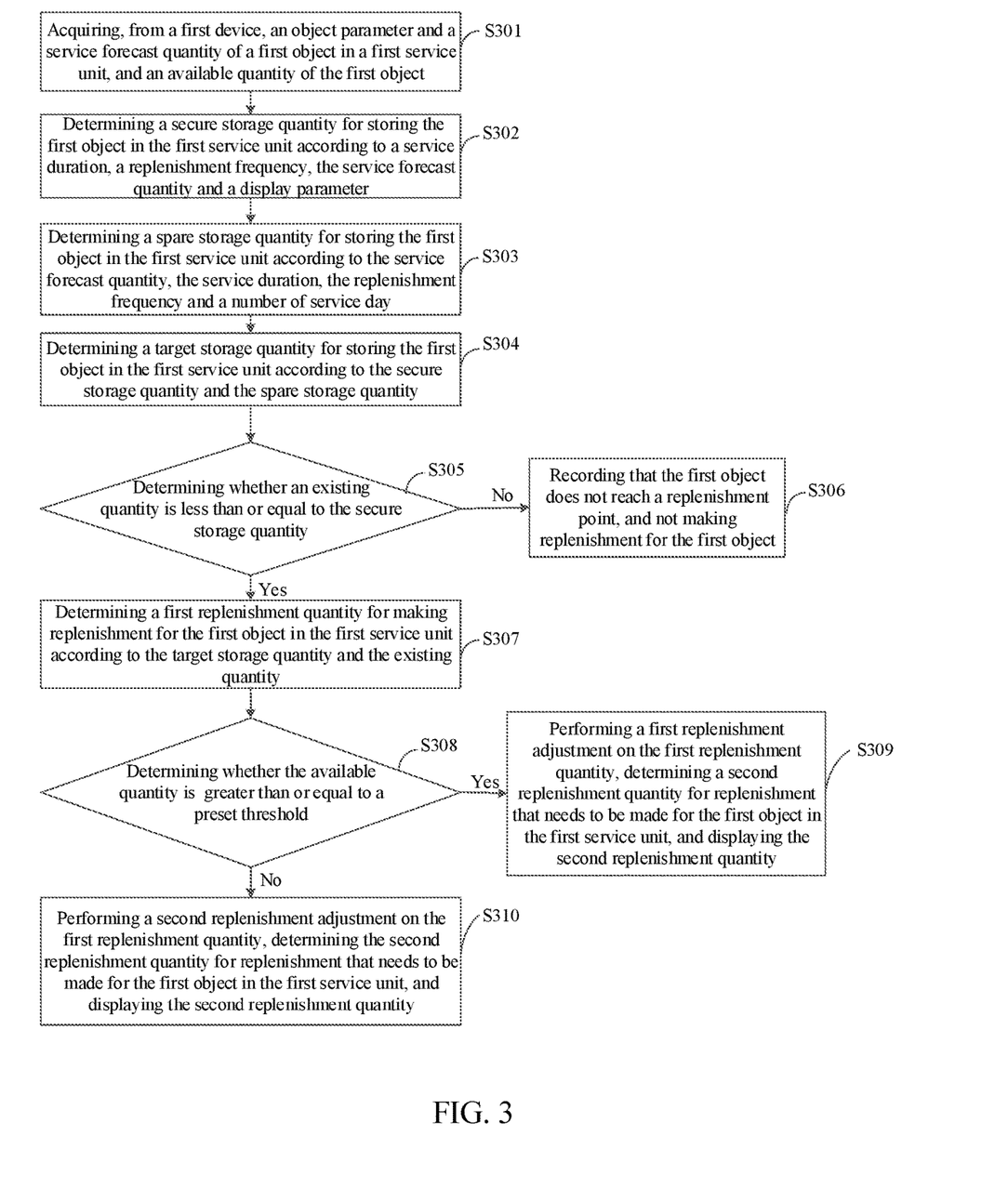
FIG. 3 is a schematic flowchart 2 of a data display method provided by one or more embodiments of the present application.

FIG. 3 is a schematic flowchart 2 of a data display method provided by one or more embodiments of the present application. As shown in FIG. 3, the data display method includes the following steps.

S301: acquiring, from a first device, an object parameter and a service forecast quantity of a first object in a first service unit, and an available quantity of the first object.

Specifically, the execution method of S301 is the same as that of S201, and the execution process of S301 will not be repeated here.

S302: determining a secure storage quantity for storing the first object in the first service unit according to a service duration, a replenishment frequency, the service forecast quantity and a display parameter.

S303: determining a spare storage quantity for storing the first object in the first service unit according to the service forecast quantity, the service duration, the replenishment frequency and a number of service day.

Specifically, S202 can be referred to for the execution method of S302~S303, and the execution process of S302~S303 will not be repeated here.

S304: determining a target storage quantity for storing the first object in the first service unit according to the secure storage quantity and the spare storage quantity.

In an implementation, the target storage quantity may be determined by the following feasible Formula 3:

$$C=A+B \qquad \text{Formula 3;}$$

where C is the target storage quantity.

S305: determining whether the existing quantity is less than or equal to the secure storage quantity.

If not, execute S306.

If yes, execute S307~S310.

S306: recording that the first object does not reach a replenishment point, and not making replenishment for the first object.

S307: determining a first replenishment quantity for making replenishment for the first object in the first service unit according to the target storage quantity and the existing quantity.

In an implementation, the first replenishment quantity may be determined by the following feasible Formula 4:

$$D=C-E \qquad \text{Formula 4;}$$

where D is the first replenishment quantity and E is the existing quantity.

S308: determining whether the available quantity is greater than or equal to a preset threshold.

If yes, execute S309.

If not, execute S310.

In an implementation, the preset threshold may be 0, 1, 2 and so on, which is not specifically limited in the present application.

S309: performing a first replenishment adjustment on the first replenishment quantity, determining a second replenishment quantity for replenishment that needs to be made for the first object in the first service unit, and displaying the second replenishment quantity.

For example, when the first object is a commodity, the first replenishment adjustment is a supply quantity adjustment. Specifically, please refer to the execution method of S403~S407 in an embodiment of FIG. 4.

S310: performing a second replenishment adjustment on the first replenishment quantity, determining the second replenishment quantity for replenishment that needs to be made for the first object in the first service unit, and displaying the second replenishment quantity.

For example, when the first object is a commodity, the second replenishment adjustment is a minimum order quantity adjustment. Specifically, please refer to an embodiment of FIG. 5.

The data display method provided in the embodiment of the present application includes: acquiring, from the first device, an object parameter and the service forecast quantity of the first object in the first service unit, and the available quantity of the first object; determining the secure storage quantity for storing the first object in the first service unit according to the service duration, the replenishment frequency, the service forecast quantity and the display parameter; determining the spare storage quantity for storing the first object in the first service unit according to the service forecast quantity, the service duration, the replenishment frequency and the number of service day; determining the target storage quantity for storing the first object in the first service unit according to the secure storage quantity and the spare storage quantity; determining whether the existing quantity is less than or equal to the secure storage quantity; if not, recording that the first object does not reach a replenishment point, and not making replenishment for the first object; if yes, determining the first replenishment quantity for making replenishment for the first object in the first service unit according to the target storage quantity and the existing quantity, and determining whether the available quantity is greater than or equal to the preset threshold; if yes, performing the first replenishment adjustment on the first replenishment quantity, determining the second replenishment quantity for replenishment that needs to be made for the first object in the first service unit, and displaying the second replenishment quantity; if not, performing the second replenishment adjustment on the first replenishment quantity, determining the second replenishment quantity for replenishment that needs to be made for the first object in the first service unit, and displaying the second replenishment quantity. In the above method, the determination of the second replenishment quantity does not need to rely on manual work, which improves the efficiency of making replenishment for the first object in the first service unit.

Further, when the available quantity is greater than or equal to the preset threshold, the first replenishment adjustment is performed on the first replenishment quantity to determine the second replenishment quantity, and when the available quantity is less than the preset threshold, the second replenishment adjustment is performed on the first replenishment quantity to determine the second replenishment quantity.

On the basis of the above embodiments, the data display method provided by the present application will be further described in detail with reference to FIG. 4.

Figure 4:
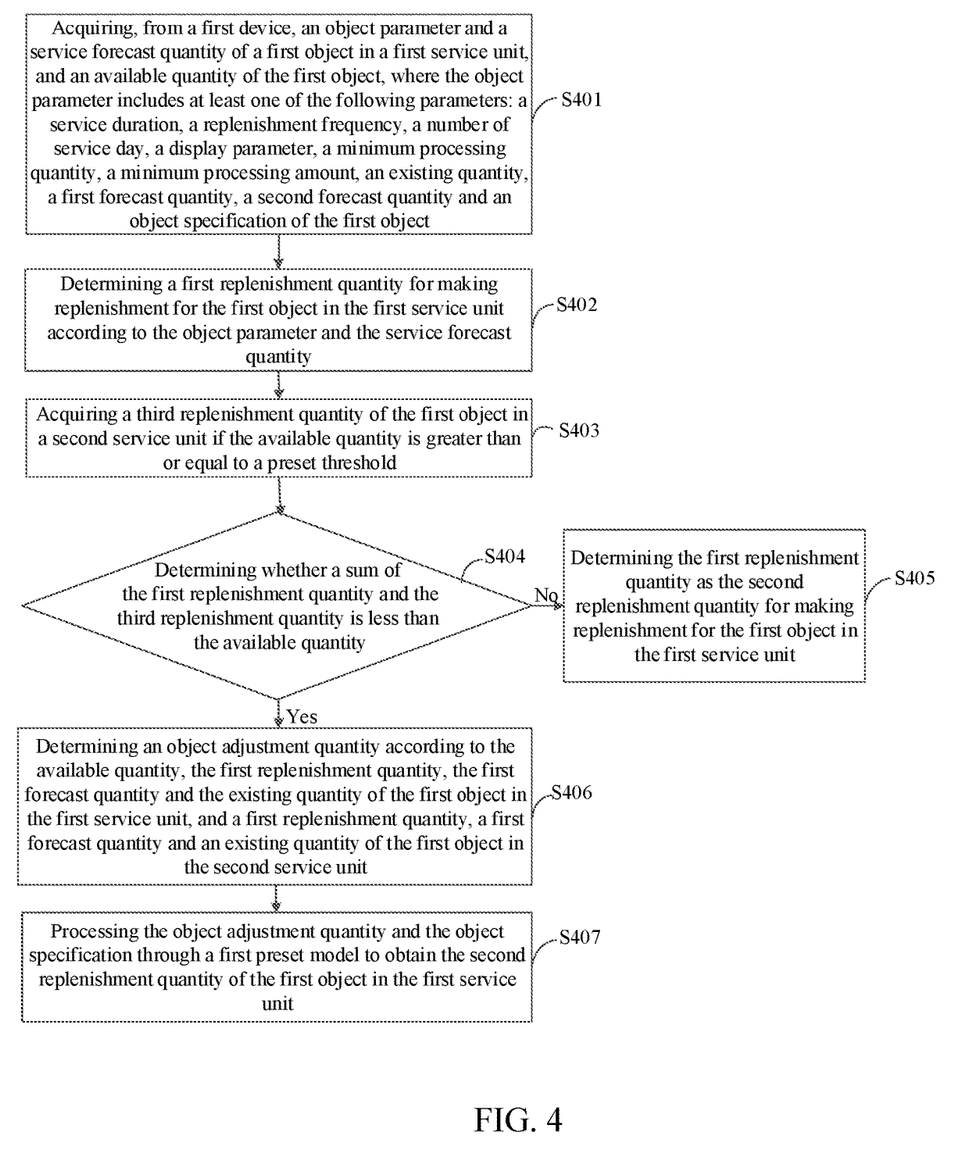
FIG. 4 is a schematic flowchart 3 of a data display method provided by one or more embodiments of the present application.

FIG. 4 is a schematic flowchart 3 of a data display method provided by one or more embodiments of the present application. As shown in FIG. 4, the data display method includes the following steps.

S401: acquiring, from a first device, an object parameter and a service forecast quantity of a first object in a first service unit, and an available quantity of the first object, where the object parameter includes at least one of the following parameters: a service duration, a replenishment frequency, a number of service day, a display parameter, a minimum processing quantity, a minimum processing amount, an existing quantity, a first forecast quantity, a second forecast quantity and an object specification of the first object.

S402: determining a first replenishment quantity for making replenishment for the first object in the first service unit according to the object parameter and the service forecast quantity.

Specifically, the execution method of S302~S307 can be referred to for the execution method of S402, which will not be repeated here.

S403: acquiring a third replenishment quantity of the first object in a second service unit if the available quantity is greater than or equal to a preset threshold.

It should be noted that when the available quantity is greater than or equal to the preset threshold, a first replenishment adjustment is performed on the first object, where the execution method of S403~S407 is a process of the first replenishment adjustment.

Specifically, the method of acquiring the third replenishment quantity of the first object in the second service unit is the same as the method of acquiring the first replenishment quantity of the first object in the first service unit, and the process of acquiring the third replenishment quantity is not repeated here.

In the present application, after a computer device of the second service unit determines the third replenishment quantity, the third replenishment quantity may be sent to the computer device of the first service unit.

The second service unit and the first service unit may be chain supermarkets associated with each other. In an implementation, the chain supermarkets associated with each other may also include a third service unit, a fourth service unit, and the like.

For example, when the chain supermarkets associated with each other includes the first service unit, the second service unit and the third service unit, it is also necessary to obtain a fourth replenishment quantity of the first object in the third service unit.

S404: determining whether a sum of the first replenishment quantity and the third replenishment quantity is less than the available quantity.

If not, execute S405.

If yes, execute S406.

For example, if the chain supermarkets associated with each other only includes the first service unit and the second service unit, whether the sum of the first replenishment quantity and the third replenishment quantity is less than the available quantity is determined; if the chain supermarkets associated with each other only includes the first service unit, the second service unit and the third service unit, whether a sum of the first replenishment quantity, the third replenishment quantity and the fourth replenishment quantity is less than the available quantity is determined.

It should be noted that when the sum of the first replenishment quantity and the third replenishment quantity is less than the available quantity, it means that a quantity of the first object for which the supplier can replenish the first service unit is the first replenishment quantity, and a quantity of the first object for which the supplier can replenish the second service unit is the third replenishment quantity.

S405: determining the first replenishment quantity as the second replenishment quantity for making replenishment for the first object in the first service unit.

S406: determining an object adjustment quantity according to the available quantity, the first replenishment quantity, the first forecast quantity and the existing quantity of the first object in the first service unit, and a first replenishment quantity, a first forecast quantity and an existing quantity of the first object in the second service unit.

In an implementation, the object adjustment quantity of the first object in the first service unit may be determined by the following feasible Formula 5:

$$\begin{cases} \frac{(A_x + A_s)/A_f}{(A_r + A_s)/A_f} = \frac{(B_x + B_s)/B_f}{(B_r + B_s)/B_f} = k \\ A_x + B_x = T \end{cases} \quad \text{Formula 5}$$

where $A_x$ is the object adjustment quantity, $A_s$ is the existing quantity of the first object in the first service unit, $A_f$ is the first forecast quantity of the first object in the first service unit, $A_r$ is the first replenishment quantity of the first object in the first service unit, $B_x$ is an object adjustment quantity of the first object in the second service unit, $B_s$ is the existing quantity of the first object in the second service unit, $B_f$ is the first forecast quantity of the first object in the second service unit, $B_r$ is the first replenishment quantity of the first object in the second service unit, k is an adjustment ratio, and T is the available quantity.

In the process of solving Formula 5, the adjustment ratio k may be determined first, and then the object adjustment quantity $A_x$ may be obtained by bringing the adjustment ratio k, the existing quantity $A_s$, the first forecast quantity $A_f$ and the first replenishment quantity $A_r$ into the above Formula 5.

In the present application, after determining the sum of the first replenishment quantity and the third replenishment quantity is less than the available quantity, the object adjustment quantity is determined according to the first replenishment quantity, the first forecast quantity and the existing quantity of the first object in the second service unit, which can realize a turnover balance of the first object between the first service unit and the second service unit under a condition that the available quantity of the supplier is satisfied.

In an implementation, a supplier may have multiple supply warehouses, and each supply warehouse has its own corresponding priority. When the supplier replenishes the first service unit for the first object through multiple supply warehouses, the first replenishment quantity may be adjusted according to a priority order to obtain the object adjustment quantity.

S407: processing the object adjustment quantity and the object specification through a first preset model to obtain the second replenishment quantity for replenishment that needs to be made for the first object in the first service unit.

In an implementation, the second replenishment quantity may be determined according to the following feasible Formula 6:

$$E_d = \text{floor}(A_x/d)*d \quad \text{Formula 6;}$$

where $E_d$ is the second replenishment quantity, floor is a round-down operation (i.e., the first preset model), and d is the object specification.

In the present application, the object adjustment quantity and the object specification are processed through the first preset model, which can ensure that the second replenishment quantity is an integer multiple of the object specification, thereby avoiding a problem that replenishment cannot be made for the first object in the first service unit because the second replenishment quantity does not meet the requirement of being integer multiple of the object specification.

The data display method provided in the embodiment of the present application includes: acquiring, from the first device, the object parameter and the service forecast quantity of the first object in the first service unit, and the available quantity of the first object, where the object parameter includes at least one of the following parameters: the service duration, the replenishment frequency, the number of service day, the display parameter, the minimum processing quantity, the minimum processing amount, the existing quantity, the first forecast quantity, the second forecast quantity and the object specification of the first object; determining the first replenishment quantity for making replenishment for the first object in the first service unit according to the object parameter and the service forecast quantity; acquiring the third replenishment quantity of the first object in the second service unit if the available quantity is greater than or equal to the preset threshold; determining whether the sum of the first replenishment quantity and the third replenishment quantity is less than the available quantity; if not, determining the first replenishment quantity as the second replenishment quantity for making replenishment for the first object in the first service unit; if yes, determining the object adjustment quantity according to the available quantity, the first replenishment quantity, the first forecast quantity, and the existing quantity of the first object in the first service unit, and the first replenishment quantity, the first forecast quantity and the existing quantity of the first object in the second service unit, and processing the object adjustment quantity and the object specification through the first preset model to obtain the second replenishment quantity for replenishment that needs to be made for the first object in the first service unit. In the above method, the determination of the second replenishment quantity does not need to rely on manual work, which improves the replenishment efficiency of the first object.

On the basis of the above embodiments, the data display method provided by the present application will be further described in detail with reference to FIG. 5.

Figure 5:
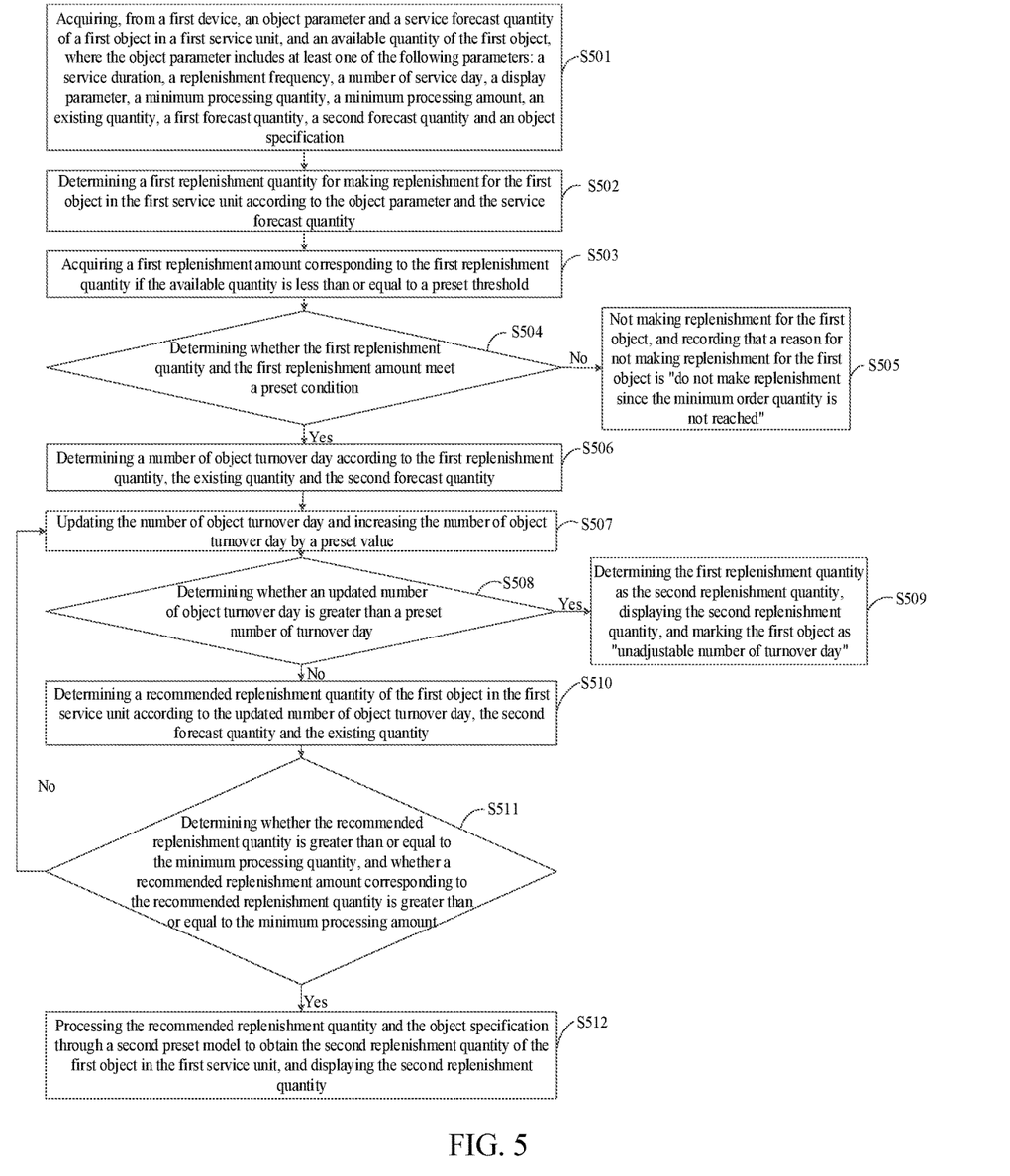
FIG. 5 is a schematic flowchart 4 of a data display method provided by one or more embodiments of the present application.

FIG. 5 is a schematic flowchart 4 of a data display method provided by one or more embodiments of the present application. As shown in FIG. 5, the data display method includes the following steps.

S501: acquiring, from a first device, an object parameter and a service forecast quantity of a first object in a first service unit, and an available quantity of the first object, where the object parameter includes at least one of the following parameters: a service duration, a replenishment frequency, a number of service day, a display parameter, a minimum processing quantity, a minimum processing amount, an existing quantity, a first forecast quantity, a second forecast quantity and an object specification.

S502: determining a first replenishment quantity for making replenishment for the first object in the first service unit according to the object parameter and the service forecast quantity.

Specifically, the execution method of S502 is the same as that of S402, which will not be repeated here.

S503: acquiring a first replenishment amount corresponding to the first replenishment quantity if the available quantity is less than or equal to a preset threshold.

In a possible design, a method of acquiring the first replenishment amount corresponding to the first replenishment quantity includes:

acquiring an object value of the first object; and
determining a product of the object value and the first replenishment quantity as the first replenishment amount.

For example, when the first object is a commodity, the object value of the first object is a purchase price.

S504: determining whether the first replenishment quantity and the first replenishment amount meet a preset condition.

If not, execute S505.

If yes, execute S506~S512.

The preset condition includes that: the first replenishment quantity is greater than a product of the minimum processing quantity and a preset coefficient; the first replenishment amount is greater than a product of the minimum processing amount and a preset coefficient; the first replenishment quantity is less than the minimum processing quantity; and the first replenishment amount is less than the minimum processing amount.

For example, when the first object is a commodity, the minimum processing quantity is a minimum order quantity, the minimum processing amount is a minimum order amount, and the preset coefficient is a minimum order coefficient.

S505: not making replenishment for the first object, and recording that a reason for not making replenishment for the first object is "do not make replenishment since the minimum order quantity is not reached".

In an implementation, first replenishment quantities of all objects under the supplier corresponding to the first object may also be set to 0.

S506: determining a number of object turnover day according to the first replenishment quantity, the existing quantity and the second forecast quantity.

In a possible design, a quotient obtained by dividing a product of the first replenishment quantity and the existing quantity by the second forecast quantity is determined as the number of object turnover day. That is, the number of object turnover day may be determined by the following feasible Formula 7:

$$t_0 = D*E/A_g \quad \text{Formula 7;}$$

where $t_0$ is the number of object turnover day, and $A_g$ is the second forecast quantity.

S507: updating the number of object turnover day and increasing the number of object turnover day by a preset value.

In an implementation, the number of object turnover day may be updated according to the following feasible Formula 8 to obtain an updated number of object turnover day $t_1$.

$$t_1 = t_D + t \quad \text{Formula 8;}$$

where $t_1$ is the updated number of object turnover day, and t is a preset value (a default value is 0.1). In an implementation, the preset value t may also be 0.2, 0.3, etc., which is not specifically limited in the present application.

S508: determining whether the updated number of object turnover day is greater than a preset number of turnover day.

If yes, execute S509.

If not, execute S510~S512.

S509: determining the first replenishment quantity as the second replenishment quantity, displaying the second replenishment quantity, and marking the first object as "unadjustable number of turnover day".

S510: determining a recommended replenishment quantity of the first object in the first service unit according to the updated number of object turnover day, the second forecast quantity and the existing quantity.

In an implementation, the recommended replenishment quantity may be determined according to the following feasible Formula 9:

$$A_t = t_1 * A_2 - A_x \quad \text{Formula 9;}$$

where $A_t$ is the recommended replenishment quantity.

S511: determining whether the recommended replenishment quantity is greater than or equal to the minimum processing quantity, and whether a recommended replenishment amount corresponding to the recommended replenishment quantity is greater than or equal to the minimum processing amount.

If not, execute S507.

If yes, execute S512.

The recommended replenishment amount corresponding to the recommended replenishment quantity is equal to a product of the recommended replenishment quantity and the object value.

In the related art, the purchase quantity of the commodity is obtained manually. Usually, the store fails to place an order due to insufficient available supply quantity of the supplier; and because the purchase quantity of the commodity is less than the minimum processing quantity, and the purchase amount is less than the minimum processing amount, a problem that the supplier does not deliver the commodity is resulted in. Different from the related art, in the present application, when the available quantity (i.e., the available supply quantity) is less than or equal to the preset threshold, the second replenishment quantity is acquired, which can avoid the problem that the first service unit fails to place an order due to the insufficient available supply quantity of the supplier. Further, the second replenishment quantity is acquired when the recommended replenishment quantity is greater than or equal to the minimum processing quantity and the recommended replenishment amount is greater than or equal to the minimum processing amount, which can avoid the problem that the supplier does not deliver the commodity because the purchase quantity is less than the minimum processing quantity and the purchase amount is less than the minimum processing amount.

S512: processing the recommended replenishment quantity and the object specification through a second preset model to obtain the second replenishment quantity of the first object in the first service unit, and displaying the second replenishment quantity.

In an implementation, the second replenishment quantity may be determined by the following feasible Formula 10:

$$E_d = \text{ceil}(A_1/d)*d \quad \text{Formula 10;}$$

where $E_d$ is the second replenishment quantity, and cell is a round-up operation (i.e., the second preset model).

In the present application, the object adjustment quantity and the object specification are processed through the second preset model, which can ensure that the second replenishment quantity is an integer multiple of the object specification, thereby avoiding the problem that replenishment cannot be made for the first object in the first service unit because the second replenishment quantity does not meet the requirement of being the integer multiple of the object specification.

The data display method provided in the embodiment of the present application includes: acquiring, from the first device, the object parameter and the service forecast quantity of the first object in the first service unit, and the available quantity of the first object, where the object parameter includes at least one of the following parameters: the service duration, the replenishment frequency, the number of service day, the display parameter, the minimum processing quantity, the minimum processing amount, the existing quantity, the first forecast quantity, the second forecast quantity and the object specification; deteimining the first replenishment quantity for making replenishment for the first object in the first service unit according to the object parameter and the service forecast quantity; acquiring the first replenishment amount corresponding to the first replenishment quantity if the available quantity is less than or equal to the preset threshold; determining whether the first replenishment quantity and the first replenishment amount meet the preset condition; if not, not making replenishment for the first object, and recording that the reason for not making replenishment for the first object is "do not make replenishment since the minimum order quantity is not reached"; if yes, determining the number of object turnover day according to the first replenishment quantity, the existing quantity and the second forecast quantity; updating the number of object turnover day and increasing the number object turnover day by the preset value; determining whether the updated number of object turnover day is greater than the preset number of turnover day; if yes, determining the first replenishment quantity as the second replenishment quantity, displaying the second replenishment quantity, and marking the first object as "unadjustable number of turnover day"; determining the recommended replenishment quantity of the first object in the first service unit according to the updated number of object turnover day, the second forecast quantity and the existing quantity; determining whether the recommended replenishment quantity is greater than or equal to the minimum processing quantity, and whether the recommended replenishment amount corresponding to the recommended replenishment quantity is greater than or equal to the minimum processing amount; if yes, processing the recommended replenishment quantity and the object specification through the second preset model to obtain the second replenishment quantity of the first object in the first service unit, and displaying the second replenishment quantity. In the above method, the determination of the second replenishment quantity can be automatically completed without relying on manual work, which improves the efficiency of making replenishment for the first object in the first service unit.

Figure 6:
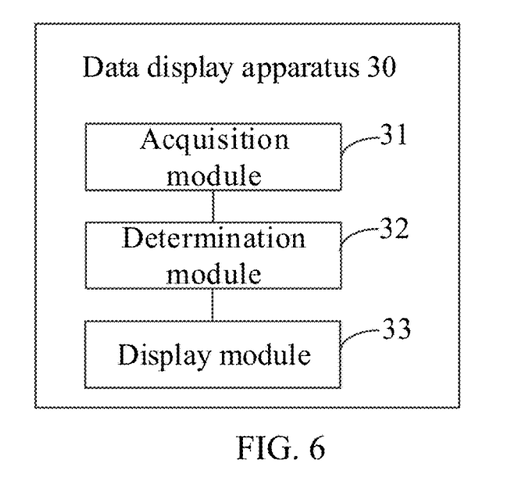
FIG. 6 is a schematic structural diagram of a data display apparatus provided by one or more embodiments of the present application.

FIG. 6 is a schematic structural diagram of a data display apparatus provided by one or more embodiments of the present application. As shown in FIG. 6, the data display apparatus 30 includes an acquisition module 31, a determination module 32, and a display module 33, where, the acquisition module 31 is configured to acquire, from a first device, an object parameter and a service forecast quantity of a first object in a first service unit, and an available quantity of the first object;

the determination module 32 is configured to determine a first replenishment quantity for making replenishment for the first object in the first service unit according to the object parameter and the service forecast quantity;

the determination module 32 is further configured to determine a second replenishment quantity for replenishment that needs to be made for the first object in the first service unit according to the available quantity and the first replenishment quantity; and the display module 33 is configured to display the second replenishment quantity.

The data display apparatus 30 provided in the embodiment of the present disclosure can perform the technical solutions shown in the above method embodiments, and the implementation principle and beneficial effects thereof are similar, which will not be repeated here.

In a possible design, the object parameter includes at least one of the following parameters: a service duration, a replenishment frequency, a number of service day, a display parameter, a minimum processing quantity, a minimum processing amount, an existing quantity, a first forecast quantity, a second forecast quantity and an object specification of the first object.

In a possible design, the determination module 32 is specifically configured to: determine a secure storage quantity for storing the first object in the first service unit according to the service duration, the replenishment frequency, the service forecast quantity and the display parameter; determine a spare storage quantity for storing the first object in the first service unit according to the service forecast quantity, the service duration, the replenishment frequency and the number of service day; and determine the first replenishment quantity according to the secure storage quantity, the spare storage quantity and the existing quantity.

In a possible design, the determination module 32 is specifically configured to: determine a target storage quantity for storing the first object in the first service unit according to the secure storage quantity and the spare storage quantity; and determine the first replenishment quantity according to the target storage quantity and the existing quantity if the existing quantity is less than or equal to the secure storage quantity.

In a possible design, the target storage quantity is a sum of the secure storage quantity and the spare storage quantity; and the first replenishment quantity is a difference between the target storage quantity and the existing quantity.

In a possible design, the determination module 32 is specifically configured to: if the available quantity is greater than or equal to a preset threshold, perform a first replenishment adjustment on the first replenishment quantity to obtain the second replenishment quantity; and if the available quantity is less than the preset threshold, perform a second replenishment adjustment on the first replenishment quantity to obtain the second replenishment quantity.

In a possible design, the determination module 32 is specifically configured to: before performing the first replenishment adjustment on the first replenishment quantity to obtain the second replenishment quantity of the first object in the first service unit, acquire a third replenishment quantity of the first object in a second service unit; and perform the first replenishment adjustment on the first replenishment quantity to obtain the second replenishment quantity if a sum of the first replenishment quantity and the third replenishment quantity is less than the available quantity.

In a possible design, the first replenishment quantity is determined as the second replenishment quantity if the sum of the first replenishment quantity and the third replenishment quantity is greater than or equal to the available quantity.

In a possible design, the determination module 32 is specifically configured to: determine an object adjustment quantity according to the available quantity, the first replenishment quantity, the first forecast quantity and the existing quantity of the first object in the first service unit, and a first replenishment quantity, a first forecast quantity and an existing quantity of the first object in the second service unit; and process the object adjustment quantity and the object specification through a first preset model to obtain the second replenishment quantity.

In a possible design, the determination module 32 is specifically configured to: acquire a first replenishment amount corresponding to the first replenishment quantity; determine a number of object turnover day according to the first replenishment quantity, the existing quantity and the second forecast quantity if the first replenishment quantity and the first replenishment amount meet a preset condition; and determine the second replenishment quantity according to the number of object turnover day, the preset number of turnover day, the second forecast quantity, the existing quantity, the minimum processing quantity, the minimum processing amount and the object specification.

In a possible design, the determination module 32 is specifically configured to: acquire an object value of the first object; and determine a product of the object value and the first replenishment quantity as the first replenishment amount.

In a possible design, the determination module 32 is specifically configured to determine a quotient obtained by dividing a product of the first replenishment quantity and the existing quantity by the second forecast quantity as the number of object turnover day.

In a possible design, the determination module 32 is specifically configured to: increase the number of object turnover day by a preset value; determine a recommended replenishment quantity of the first object in the first service unit according to an updated number of object turnover day, the second forecast quantity and the existing quantity if the updated number of object turnover day is greater than the preset number of turnover day; and determine the second replenishment quantity according to the recommended replenishment quantity, a recommended replenishment amount corresponding to the recommended replenishment quantity, the minimum processing quantity, the minimum processing amount and the object specification.

In a possible design, the determination module 32 is specifically configured to: if the recommended replenishment quantity is greater than or equal to the minimum processing quantity, and the recommended replenishment amount is greater than or equal to the minimum processing amount, process the recommended replenishment quantity and the object specification through a second preset model to obtain the second replenishment quantity.

The data display apparatus 30 provided in the embodiment of the present disclosure can implement the technical solutions shown in the above method embodiments, and the implementation principle and beneficial effects thereof are similar, which will not be repeated here.

Figure 7:
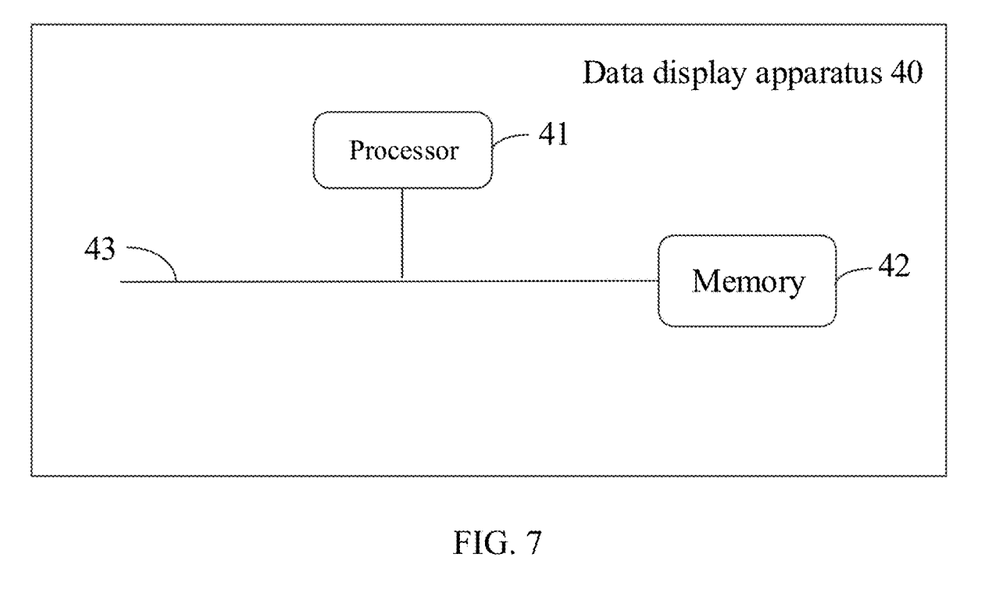
FIG. 7 is a schematic diagram of a hardware structure of a data display apparatus provided by one or more embodiments of the present application.

FIG. 7 is a schematic diagram of a hardware structure of a data display apparatus provided by one or more embodiments of the present application. As shown in FIG. 7, the data display apparatus 40 includes: at least one processor 41 and a memory 42. The processor 41 and the memory 42 are connected by a bus 43.

In a specific implementation process, the at least one processor 41 executes computer execution instructions stored in the memory 42, so that the at least one processor 41 executes the above data display method.

The above method embodiments may be referenced to for the specific implementation process of the processor 41. The implementation principle and technical effects thereof are similar, and details will not be repeated in this embodiment here.

In the above embodiment shown in FIG. 7, it should be understood that the processor may be a central processing unit (Central Processing Unit, CPU) or other general-purpose processor, digital signal processor (Digital Signal Processor, DSP), application specific integrated circuit (Application Specific Integrated Circuit, ASIC), etc. The general-purpose processor may be a microprocessor or the processor may be any conventional processor or the like. Steps of the methods disclosed in combination with the present disclosure may be directly embodied as being executed by a hardware processor, or being executed by a combination of hardware and software modules in the processor.

The memory may include a high-speed random access memory RAM memory, and may also include a non-volatile memory NVM, such as at least one disk memory.

The bus may be an industry standard architecture (Industry Standard Architecture, ISA) bus, a peripheral component (Peripheral Component, PCI) bus, or an extended industry standard architecture (Extended Industry Standard Architecture, EISA) bus, etc. The bus may be divided into an address bus, a data bus and a control bus, etc. For ease of representation, the bus in the drawings of the present application is not limited to only one bus or one type of buses.

The present application further provides a computer-readable storage medium, where the computer-readable storage medium stores computer execution instructions, and when a processor executes the computer execution instructions, the above data display method is implemented.

For the above-mentioned computer-readable storage medium, the above readable storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disc. The readable storage medium may be any available medium that can be accessed by a general-purpose or special-purpose computer.

An exemplary readable storage medium is coupled to a processor so that the processor can read information from the readable storage medium and can write information to the readable storage medium. Of course, the readable storage medium may also be an integral part of the processor. The processor and the readable storage medium may be located in application specific integrated circuits (Application Specific Integrated Circuits, ASIC). Of course, the processor and the readable storage medium may also exist in a device as separate components.

The division of units is only a logical function division. In actual implementation, there may be other division methods. For example, multiple units or components may be combined or integrated into another system, or some features may be ignored or not implemented. On the other hand, mutual coupling or direct coupling or communication connection shown or discussed may be indirect coupling or communication connection through some interfaces, apparatuses or units, and may be electrical, mechanical or in other forms.

Units described as separate components may or may not be physically separated, and the components shown as units may or may not be physical units, that is, may be located in one place or may be distributed over multiple network units. Some or all of the units may be selected according to actual needs to realize the purpose of the solutions in the embodiments.

In addition, the functional units in the embodiments of the present disclosure may be integrated into one processing unit, or each unit may physically exist separately, or two or more units may be integrated into one unit.

Functions, if implemented in a form of software functional units and sold or used as an independent product, may be stored in a computer-readable storage medium. Based on this understanding, a technical solution of the present disclosure in essence, or the part that contributes to the related art, or the part of the technical solution can be embodied in a form of a software product. The computer software product is stored in a storage medium, including several instructions for causing a computer device (which may be a personal computer, a server, or a network device, etc.) to execute all or part of the steps of the methods according to various embodiments of the present disclosure. The aforementioned storage medium includes various media that can store program codes, such as a U disk, a mobile hard disk, a read-only memory (ROM, Read-Only Memory), a random access memory (RAM, Random Access Memory), a magnetic disk or an optical disk.

Those skilled in the art can understand that all or part of the steps to implement the above method embodiments can be completed by hardware related to program instructions. The above program may be stored in a computer-readable storage medium. When the program is executed, the steps including the above method embodiments are executed. The above storage medium includes various media that can store program code, such as a ROM, a RAM, a magnetic disk or an optical disk.

An embodiment of the present application further provides a program product including a computer program. The program product causes a computer to execute the above-mentioned data display method when running on the computer.

An embodiment of the present application further provides a computer program for executing the above-mentioned data display method when the computer program is executed by a processor.

Finally, it should be noted that the above embodiments are only used to illustrate the technical solutions of the present disclosure, but not to limit them. Although the present disclosure has been described in detail with reference to the above embodiments, those skilled in the art should understand that they can still modify the technical solutions described in the above embodiments, or equivalently replace some or all of the technical features. These modifications or substitutions do not make the essence of the corresponding technical solutions depart from the scope of the technical solutions of the embodiments of the present disclosure.

The invention claimed is:

1. A data display method, wherein the method is executed by a computer device provided in a first service unit and comprises:

acquiring, from a first device, an object parameter and a service forecast quantity of a first object in the first service unit, and an available quantity of the first object;

determining a first replenishment quantity for making replenishment for the first object in the first service unit according to the object parameter and the service forecast quantity;

determining a second replenishment quantity for replenishment that needs to be made for the first object in the first service unit according to the available quantity and the first replenishment quantity, and displaying the second replenishment quantity; and sending the second replenishment quantity to a computer device corresponding to a supplier, wherein the second replenishment quantity is used to indicate a quantity of the first object that the supplier replenishes for the first service unit.

2. The method according to claim 1, wherein the object parameter comprises at least one of the following parameters: a service duration, a replenishment frequency, a number of service day, a display parameter, a minimum processing quantity, a minimum processing amount, an existing quantity, a first forecast quantity, a second forecast quantity and an object specification of the first object.

3. The method according to claim 2, wherein determining the first replenishment quantity for making replenishment for the first object in the first service unit according to the object parameter and the service forecast quantity comprises:

determining a secure storage quantity for storing the first object in the first service unit according to the service duration, the replenishment frequency, the service forecast quantity and the display parameter;

determining a spare storage quantity for storing the first object in the first service unit according to the service forecast quantity, the service duration, the replenishment frequency and the number of service day; and determining the first replenishment quantity according to the secure storage quantity, the spare storage quantity and the existing quantity.

4. The method according to claim 3, wherein determining the first replenishment quantity according to the secure storage quantity, the spare storage quantity and the existing quantity comprises:

determining a target storage quantity for storing the first object in the first service unit according to the secure storage quantity and the spare storage quantity; and determining the first replenishment quantity according to the target storage quantity and the existing quantity upon determining that the existing quantity is less than or equal to the secure storage quantity.

5. The method according to claim 4, wherein, the target storage quantity is a sum of the secure storage quantity and the spare storage quantity; and the first replenishment quantity is a difference between the target storage quantity and the existing quantity.

6. The method according to claim 2, wherein determining the second replenishment quantity for replenishment that needs to be made for the first object in the first service unit according to the available quantity and the first replenishment quantity comprises:

upon determining that the available quantity is greater than or equal to a preset threshold, performing a first replenishment adjustment on the first replenishment quantity to obtain the second replenishment quantity; and upon determining that the available quantity is less than the preset threshold, performing a second replenishment adjustment on the first replenishment quantity to obtain the second replenishment quantity.

7. The method according to claim 6, before performing the first replenishment adjustment on the first replenishment quantity to obtain the second replenishment quantity of the first object in the first service unit, further comprising:
acquiring a third replenishment quantity of the first object in a second service unit; and
performing the first replenishment adjustment on the first replenishment quantity to obtain the second replenishment quantity upon determining that a sum of the first replenishment quantity and the third replenishment quantity is less than the available quantity.

8. The method according to claim 7, further comprising:
determining the first replenishment quantity as the second replenishment quantity upon determining that the sum of the first replenishment quantity and the third replenishment quantity is greater than or equal to the available quantity.

9. The method according to claim 6, wherein performing the first replenishment adjustment on the first replenishment quantity to obtain the second replenishment quantity comprises:
determining an object adjustment quantity according to the available quantity, the first replenishment quantity, the first forecast quantity and the existing quantity of the first object in the first service unit, and a first replenishment quantity, a first forecast quantity and an existing quantity of the first object in a second service unit; and
processing the object adjustment quantity and the object specification through a first preset model to obtain the second replenishment quantity.

10. The method according to claim 6, wherein performing the second replenishment adjustment on the first replenishment quantity to obtain the second replenishment quantity comprises:
acquiring a first replenishment amount corresponding to the first replenishment quantity;
determining a number of object turnover day according to the first replenishment quantity, the existing quantity and the second forecast quantity upon determining that the first replenishment quantity and the first replenishment amount meet a preset condition; and
determining the second replenishment quantity according to the number of object turnover day, a preset number of turnover day, the second forecast quantity, the existing quantity, the minimum processing quantity, the minimum processing amount and the object specification.

11. The method according to claim 10, wherein acquiring the first replenishment amount corresponding to the first replenishment quantity comprises:
acquiring an object value of the first object; and
determining a product of the object value and the first replenishment quantity as the first replenishment amount.

12. The method according to claim 10, wherein determining the number of object turnover day according to the first replenishment quantity, the existing quantity and the second forecast quantity comprises:
determining a quotient obtained by dividing a product of the first replenishment quantity and the existing quantity by the second forecast quantity as the number of object turnover day.

13. The method according to claim 10, wherein determining the second replenishment quantity according to the number of object turnover day, the preset number of turnover day, the second forecast quantity, the existing quantity, the minimum processing quantity, the minimum processing amount and the object specification comprises:
increasing the number of object turnover day by a preset value;
determining a recommended replenishment quantity of the first object in the first service unit according to an updated number of object turnover day, the second forecast quantity and the existing quantity upon determining that the updated number of object turnover day is greater than the preset number of turnover day; and
determining the second replenishment quantity according to the recommended replenishment quantity, a recommended replenishment amount corresponding to the recommended replenishment quantity, the minimum processing quantity, the minimum processing amount and the object specification.

14. The method according to claim 13, wherein determining the second replenishment quantity according to the recommended replenishment quantity, the recommended replenishment amount corresponding to the recommended replenishment quantity, the minimum processing quantity, the minimum processing amount and the object specification comprises:
upon determining that the recommended replenishment quantity is greater than or equal to the minimum processing quantity, and the recommended replenishment amount is greater than or equal to the minimum processing amount, processing the recommended replenishment quantity and the object specification through a second preset model to obtain the second replenishment quantity.

15. A data display apparatus, comprising at least one processor and a memory;
the memory stores computer execution instructions that are executable by the at least one processor, and the at least one processor is configured to execute the computer execution instructions to:
acquire, from a first device, an object parameter and a service forecast quantity of a first object in a first service unit, and an available quantity of the first object;
determine a first replenishment quantity for making replenishment for the first object in the first service unit according to the object parameter and the service forecast quantity;
determine a second replenishment quantity for replenishment that needs to be made for the first object in the first service unit according to the available quantity and the first replenishment quantity; and
display the second replenishment quantity, and
send the second replenishment quantity to a computer device corresponding to a supplier, wherein the second replenishment quantity is used to indicate a quantity of the first object that the supplier replenishes for the first service unit.

16. A non-transitory computer-readable storage medium, wherein computer execution instructions are stored in the computer-readable storage medium, and when a processor executes the computer execution instructions, following operations are implemented:

acquiring, from a first device, an object parameter and a service forecast quantity of a first object in a first service unit, and an available quantity of the first object;

determining a first replenishment quantity for making replenishment for the first object in the first service unit according to the object parameter and the service forecast quantity;

determining a second replenishment quantity for replenishment that needs to be made for the first object in the first service unit according to the available quantity and the first replenishment quantity, and displaying the second replenishment quantity, and sending the second replenishment quantity to a computer device corresponding to a supplier, wherein the second replenishment quantity is used to indicate a quantity of the first object that the supplier replenishes for the first service unit.

17. The data display apparatus according to claim 15, wherein the object parameter comprises at least one of the following parameters: a service duration, a replenishment frequency, a number of service day, a display parameter, a minimum processing quantity, a minimum processing amount, an existing quantity, a first forecast quantity, a second forecast quantity and an object specification of the first object.

18. The data display apparatus according to claim 17, wherein the at least one processor is configured to:

determine a secure storage quantity for storing the first object in the first service unit according to the service duration, the replenishment frequency, the service forecast quantity and the display parameter;

determine a spare storage quantity for storing the first object in the first service unit according to the service forecast quantity, the service duration, the replenishment frequency and the number of service day; and determine the first replenishment quantity according to the secure storage quantity, the spare storage quantity and the existing quantity.

19. The data display apparatus according to claim 18, wherein the at least one processor is further configured to:

determine a target storage quantity for storing the first object in the first service unit according to the secure storage quantity and the spare storage quantity; and determine the first replenishment quantity according to the target storage quantity and the existing quantity upon determining that the existing quantity is less than or equal to the secure storage quantity.

20. The data display apparatus according to claim 19, wherein, the target storage quantity is a sum of the secure storage quantity and the spare storage quantity; and the first replenishment quantity is a difference between the target storage quantity and the existing quantity.

* * * * *